United States Patent Office.

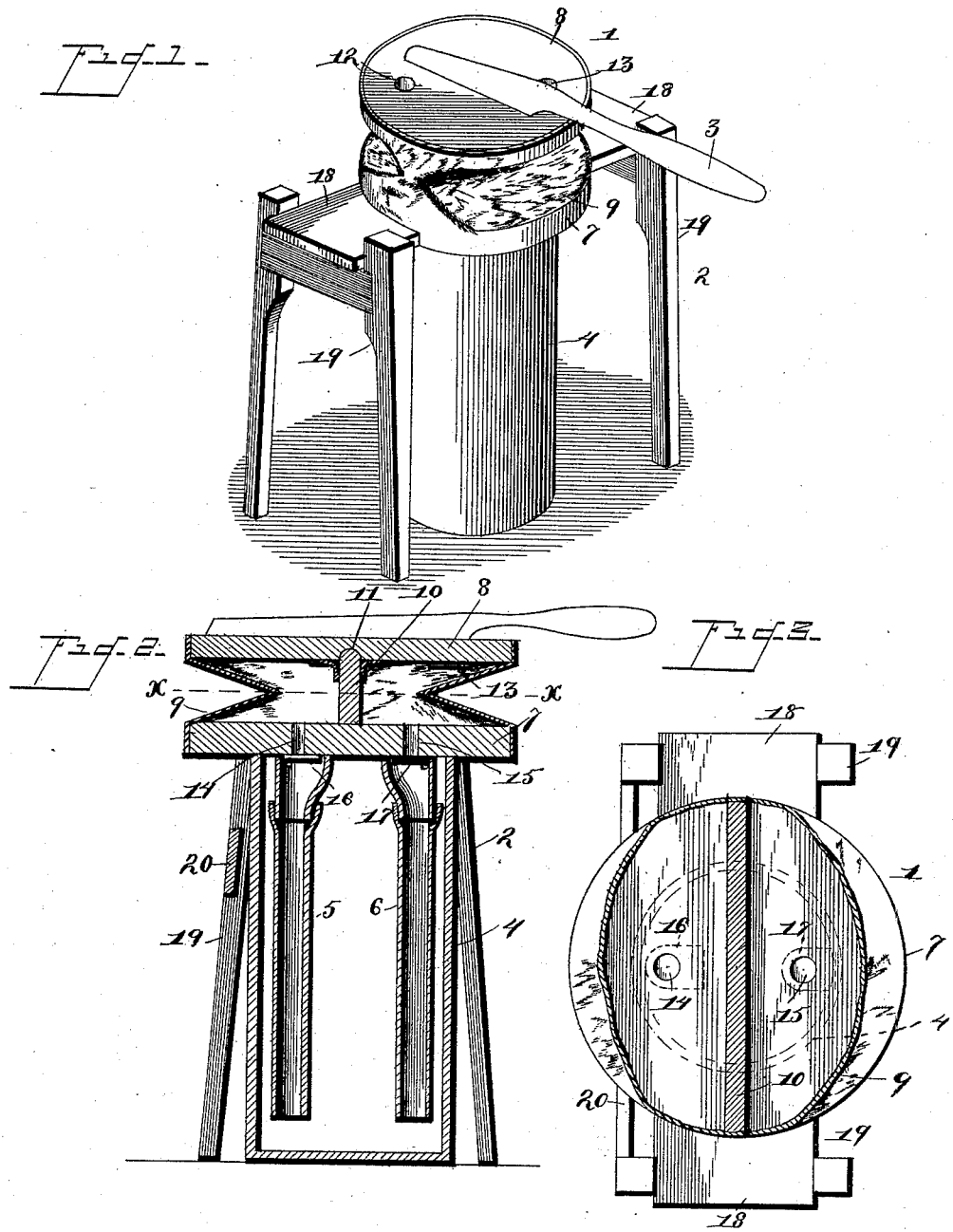

ANDREW MEARNS, OF MOUNT STERLING, KENTUCKY, ASSIGNOR OF ONE-HALF TO ROBERT E. WHITE, OF SAME PLACE.

DOUBLE-ACTING BELLOWS FOR CHURNS.

SPECIFICATION forming part of Letters Patent No. 426,509, dated April 29, 1890.

Application filed February 20, 1890. Serial No. 341,128. (No model.)

*To all whom it may concern:*

Be it known that I, ANDREW MEARNS, a citizen of the United States, residing at Mount Sterling, in the county of Montgomery and State of Kentucky, have invented a new and useful Double-Acting Bellows for Churns, of which the following is specification.

The invention relates to improvements in double-acting bellows for churns.

The object of the present invention is to provide a simple and inexpensive bellows adapted to be readily applied to a churn of the ordinary construction, and capable of being readily operated and of causing a continuous current of air to pass through the cream under operation and of quickly converting the same into butter.

The invention consists in the construction and novel combination and arrangement of parts hereinafter fully described, illustrated in the accompanying drawings, and pointed out in the claims hereto appended.

In the drawings, Figure 1 is a perspective view of a bellows constructed in accordance with this invention and shown applied in operative position to a churn. Fig. 2 is a transverse sectional view. Fig. 3 is a horizontal sectional view taken on the line $x\,x$ of Fig. 2.

Referring to the accompanying drawings, 1 designates a double-acting bellows, which is mounted upon a frame 2 and is operated by a lever 3, and communicates with a churn 4 by means of tubes 5 and 6.

The bellows consists of a pair of disks 7 and 8, that have their edges connected by leather 9 in the usual manner. The bellows is divided into two compartments by a transverse partition 10, that is rigidly secured to the lower disk 7, and has its upper edge curved and arranged in a curved groove 11, thereby fulcruming the upper disk 8, to which the handle or operating-lever 3 is secured. The upper disk 8 is provided with inlet-valves 12 and 13, by means of which air is admitted to the interior of the vessel, and as the upper disk is oscillated on its fulcrum air is alternately forced through the tubes or pipes 5 and 6, that communicate with the churn 4. The lower stationary disk 7 is provided with openings 14 and 15, on the outside of which are arranged valves 16 and 17, that prevent the return of the air or the cream being drawn into the bellows by the return-stroke of the latter. The lower disk 7 is provided with flanges 18, that are arranged upon opposite sides of the disk, and are adapted to rest upon the trusses 19 of the frame 2, which trusses are connected on one side of the frame by a cross-bar 20, the other side being left open to enable the churn to be readily placed beneath the bellows and to facilitate removal therefrom.

The bellows is provided with strips of leather or other suitable material, which are arranged upon opposite sides of the transverse partition around the point of attachment to the upper disk, and they effectually prevent the air of one compartment of the bellows escaping when compressed into the other compartment.

From the foregoing description and the accompanying drawings the construction, operation, and advantages of the invention will readily be understood.

The tubes 5 6 are made of two or more joints, whereby they may be separated to clean the same after churning.

What I claim is—

1. A double-acting bellows for churns, comprising the disks 7 and 8, having their edges connected by leather in the usual manner, and the transverse partition dividing the bellows into two compartments, and being rigidly secured to the lower disk and serving as a fulcrum for the upper disk, substantially as and for the purpose described.

2. A double-acting bellows for churns, comprising the lower disk 7, designed to be suitably mounted upon the frame and provided with a transverse partition adapted to divide the bellows into two compartments and having its upper edge curved, the upper disk provided with a transverse groove and fulcrumed upon the transverse partition, the leather 9, connecting the edges of the disks, and the depending tubes or pipes communicating with the compartments, substantially as and for the purpose described.

3. A portable double-acting bellows for churns, the same comprising the lower disk 7, adapted to be suitably mounted upon a frame, and having the valved openings 14 15 and the depending jointed tubes 5 6, combined with the upper disk 8, having handle 3, the partition 10, and leather 9, as set forth.

In testimony that I claim the foregoing as my own I have hereto affixed my signature in presence of two witnesses.

ANDREW MEARNS.

Witnesses:
J. H. ROBERTS,
G. W. BERKLEY.